United States Patent
Vaughn et al.

[11] Patent Number: 6,128,965
[45] Date of Patent: Oct. 10, 2000

[54] BAG PRESSURE MONITOR

[75] Inventors: Mark Roy Vaughn; Alva Keith Miller, both of Albuquerque, N. Mex.

[73] Assignee: Sandia Corporation, Albuquerque, N. Mex.

[21] Appl. No.: 09/012,040

[22] Filed: Jan. 22, 1998

[51] Int. Cl.[7] ...................................................... G01L 1/04
[52] U.S. Cl. ...................................................... 73/862.451
[58] Field of Search ...................... 73/862.451, 862.043, 73/862.041, 862.044, 862.046, 862.391, 862.042, 862.69, 862.48

[56] References Cited

U.S. PATENT DOCUMENTS

| | | | |
|---|---|---|---|
| 621,486 | 4/1899 | Burdick . | |
| 2,222,259 | 11/1940 | Hoffmann et al. . | |
| 3,546,944 | 12/1970 | Mack | 73/388 |
| 4,546,656 | 10/1985 | Grundy et al. | 73/862.48 |
| 4,738,140 | 4/1988 | Kempf | 73/730 |
| 4,787,627 | 11/1988 | Daubenspeck | 272/99 |
| 4,964,299 | 10/1990 | Maier et al. | 73/862.48 |
| 5,416,279 | 5/1995 | Tseng | 177/132 |
| 5,478,310 | 12/1995 | Dyson-Cantwell et al. | 604/23 |
| 5,537,858 | 7/1996 | Bauer | 73/49.3 |
| 5,565,632 | 10/1996 | Ogawa | 73/862.69 |
| 5,662,625 | 9/1997 | Westwood | 604/305 |
| 5,670,720 | 9/1997 | Clark et al. | 73/730 |

OTHER PUBLICATIONS

M. Heng, et al, A Simplified Hyperbaric Oxygen Technique for Leg Ulcers, Arch Dermatol—vol. 120, May 1984.

M. Heng, et al, Endothelial Cell Toxicity in Leg Ulcers Treated with Topical Hyperbaric Oxygen—The American Journal of Dermalopathology 8(3): 403–410, 1986.

M. Heng, et al, *Topical Hyperbaric Therapy for Problem Skin Wounds*, 1993, Elsevier Science Publishing Co., Inc. 0148–0812/93.

*Primary Examiner*—Benjamin R. Fuller
*Assistant Examiner*—Jewel V. Thompson
*Attorney, Agent, or Firm*—George H. Libman

[57] ABSTRACT

An inexpensive mechanical indicator for measuring low pressure in an inflating bag includes a pair of sides connected to each other at one edge and pivotally connected at spaced parallel locations on the bag. A spring biases the sides towards each other in opposition to tension in the inflating bag. The distance between the sides is indicative of the pressure in the bag. The device is accurate at pressures below 0.05 psi.

24 Claims, 2 Drawing Sheets

BAG PRESSURE MONITOR

The United States Government has rights in this invention pursuant to Department of Energy Contract No. DE-AC04-94AL85000 with Sandia Corporation.

BACKGROUND OF THE INVENTION

There are some applications where a polyethylene or similar bag must be inflated and maintained at a pressure within a predetermined range. One particular application for such a bag is in the treatment of open skin wounds. As discussed in U.S. Pat. No. 5,478,310 of Evelyn Dyson-Cantwell et al., healing is enhanced if the portion of a body having an open wound is sealed inside a bag filled with hyperbaric oxygen at a precise low pressure. This pressure must be maintained within rigid bounds for the treatment to be effective. Typical treatment regimes call for application of oxygen for several hours a day for several weeks.

Many instruments are available for monitoring high pressure. However, in the aforementioned medical application, the upper end of the pressure range is on the order of 0.05 psi, a value so low that most conventional gauges are not capable of making the measurement. (A pressure of 0.05 psi will push water up a drinking straw only 1.4".) Furthermore, electronic pressure transducers may not be used around oxygen for fear of fire due to the possibility of spark production. Expensive mechanical pressure devices are also not desirable for medical applications where everything used in the treatment must either be disposed of as a biohazard or sterilized after each use. The indicator also should be readable across a room (about 10 feet), and it must be useable without on-site calibration.

U.S. Pat. No. 3,546,944 of R. Mack discloses an inexpensive device that adheres at two spaced locations on an inflatable bag used as a splint. In most of the disclosed embodiments, the Mack device breaks if the pressure exceeds a predetermined value on the order of 40 psi. However, the embodiment of FIG. 10 of the Mack patent has an elastic strip fastened between two spaced locations, and a scale attached at one location that provides an indication of pressure as the strip expands due to pressure in the bag. FIG. 11 shows measurements as low as 0.1 psi that appear to have been made with the elastic strip embodiment of Mack.

The non-linear measurements shown in FIG. 11 indicate that Mack's strip is in contact with the surface of his bag, where friction effects the accuracy of the reading. This friction makes it very unlikely that this device would perform well enough for the medical application at measurements below 0.1 psi. Furthermore, if Mack's device were made sufficiently small to minimize the effect of friction, it would be very difficult to read at any distance.

SUMMARY OF THE INVENTION

It is an object of this invention to provide an indicator for pressure less than 0.1 psi in a sealed bag.

It is another object of this invention to provide a low pressure indicator that may be read at a distance.

It is still another object of this invention to provide a low pressure indicator that does not require it situ calibration before each use.

It is also an object of this invention to provide a low pressure indicator that is spark free and that does not penetrate the bag wall.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise an apparatus for measuring the tension in a predetermined direction between two portions of a flexible surface, said apparatus comprising first and second sides each having a first end and an opposed second end, said second ends being connected together, the first sides being pivotally connected to the surface at spaced, parallel, locations. Spring means are provided to bias the sides towards each other in opposition to the expansion force of the surface. An indicator measures the relative position of the first side with respect to said second side to indicate the tensile force imparted to the surface by the internal pressure

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
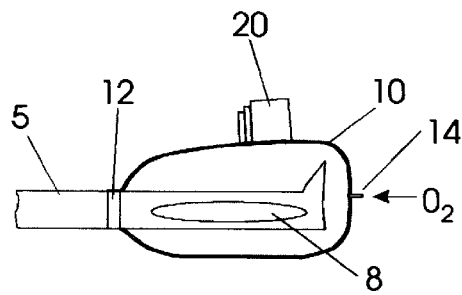
FIG. 1 shows the invention on a bag.

FIG. 1 shows a body portion 5 having a open skin wound 8 that has been enclosed in a clear tubular polyethylene bag 10 having a wall thickness on the order of 0.006 inch. A sealing band 12 seals the opening of bag 10 to body portion 5. Hyperbaric oxygen is introduced into bag 10 through a inlet 14 connected to an oxygen source (not shown). One such bag is marketed as a Numobag™ by Numotech, Inc., Encino, Calif.

For a successful treatment of wound 8, bag 10 must be maintained at a predetermined pressure on the order of 0.05 psi or less, a pressure at which bag 10 is softly inflated. In accordance with this invention, an indicator 20 is fastened to an outer surface of bag 10.

Figure 2:
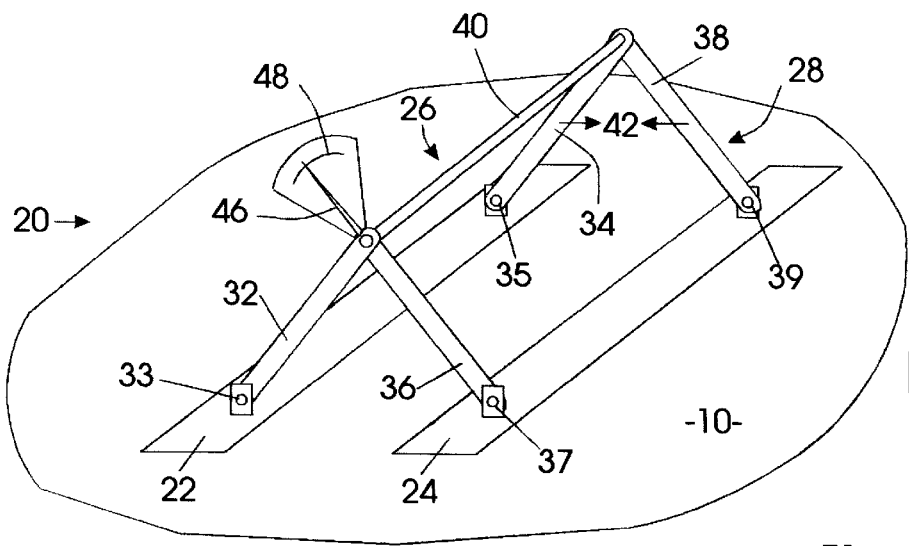
FIG. 2 shows a first embodiment of the invention.

FIG. 2 shows a first embodiment of indicator 20 to include a pair of elongated rails, 22, 24, adhered to the surface of bag 10 by a conventional glue, double-sided tape, or adhesive well known to those of ordinary skill in the art. Rails 22 and 24 are preferably made of rigid material such as plastic or metal and are spaced apart a predetermined distance in a parallel arrangement. Legs 32 and 34 each have one end pivotally connected to rail 22 at spaced locations 33 and 35, respectively, Legs 36 and 38 each have one end pivotally connected to rail 24 at spaced locations 37 and 39, respectively. The other ends of legs 32 and 36 are pivotally connected together, as are the other ends of legs 34 and 38. A rod 40 connects the two sets of other ends.

More broadly described, the invention includes a first side 26 defined by legs 32 and 34 and rod 40 and a second side 28 defined by legs 36 and 38 and rod 40. A first end of side 26 is pivotally connected at 33 and 35 to a first location on the surface of bag 10. A first end of similar side 28 is pivotally connected at 37 and 39 to a second location on bag 10. A spring, represented by arrows 42, biases side 26 toward side 28, causing the flexible bag material to protrude either inwardly or outwardly from the surface. Inflation of bag 10 causes the tension in bag 10 between rails 22 and 24 to increase, overcoming the force of spring 42, This increased tension, which is measured as an increase in the distance between rails 22 and 24, is indicated by a pointer 46 rigidly attached to one of legs 32, 36 and an adjacent scale 48 rigidly attached to the other of legs 32, 36.

Spring 42 may be of any form. For example, it may be either a tension spring stretched between the sides as indicated by the arrows, or it may be a torsion spring wrapped around rod 40 with ends acting on adjacent legs 32, 36.

Calibration of the device is accomplished in a laboratory by placing an indicator 20 on a bag 10 and accurately measuring the pressure using laboratory instruments. The position of rails 22, 24 on bag 10 is noted, as is the position of pointer 46 relative to scale 48. For subsequent medical applications, placement of a similar indicator 20 at the same location on a similar bag 10 will give identical results.

The size of this embodiment is not too important as long as the indicator is large enough to be read across a room. In one test of the invention, rails 22, 24 were approximately 15 cm long by 1.0 cm wide, and their inner edges were separated by about 8 cm after they were adhered to bag 10. The length of each leg 32–38 was about 7 cm.

Figure 3:
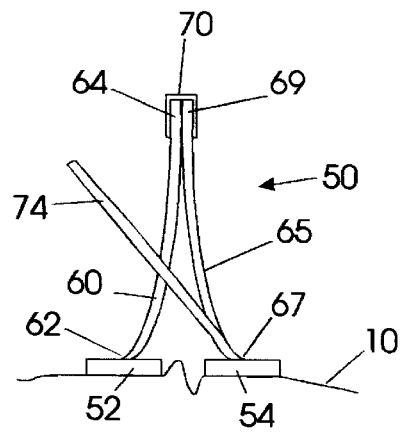
FIG. 3 shows an end view of a preferred embodiment of the invention.
Figure 4:
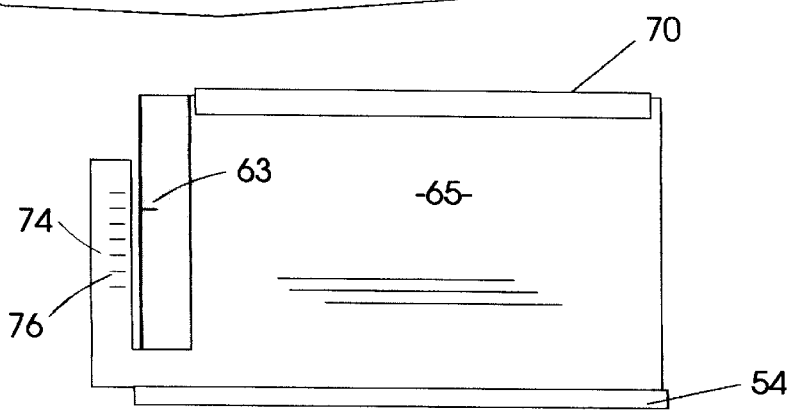
FIG. 4 shows a side view of the embodiment of FIG. 3.

An alternative embodiment shown in FIGS. 3 and 4 provides additional advantages over the embodiment of FIG. 2. Indicator 50 of this embodiment has elongate members 52 and 54 which adhere to bag 10 and perform the equivalent functions of rails 22, 24 of FIG. 2. Sides 60 and 65 are formed from an elastic sheet material such as NEMA Grade G-10 plastic or aluminum that is planar in a resting state. Each side, which is rectangular in the disclosed embodiment, has second ends 64, 69 clamped together to prevent movement relative to one another, and first ends 62, 67 pivotally connected to members 52, 54, respectively. As shown in FIGS. 3 and 4, each sheet elastically deflects from its plane when the first ends are spread by an inflating bag 10. The springy sheet material pulls the first ends together as it attempts to return to the planar state, performing the function of spring 42 in FIG. 2.

The aforementioned clamping is preferably accomplished with an elongated U-shaped rigid clamp 70 that extends along the length of sides 60, 65 and is positioned over the second ends 64, 69. This construction enables the invention to be shipped prior to assembly. The user merely places sheets 60, 65 together and slips clamp 70 over the second ends. First ends 62, 67 are then attached as discussed hereinafter, and the device is ready for use. Alternative clamping such as staples, rivets, etc. may also be used to hold sheets 60, 65 together.

Pressure indication for this embodiment may be provided by any member extending from a moveable portion of one side across a moveable portion of the other side. For example, strip 74 may be integral to side 65 and extend freely from first end 67 across side 60. The position of strip 74 relative to side 60 will change as the distance changes between first ends 62, 67. If strip 74 is spaced from edge 66 of side 65, then a reference mark 63 on side 60 may be compared with a scale 76 on strip 74 to determine the pressure within bag 10.

Figure 5:
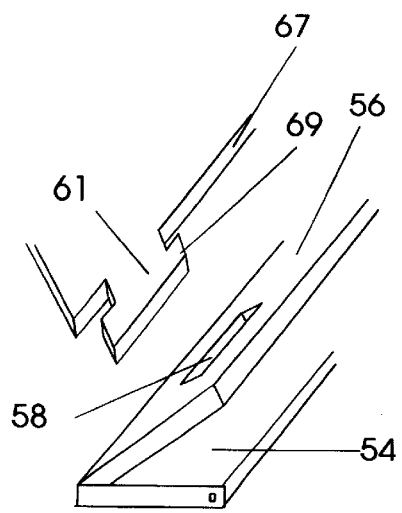
FIG. 5 shows a first embodiment of a detail of the embodiment of FIG. 3.

It is believed desirable for accuracy for each side of indicator 20 to be pivotally connected to bag 10 to minimize the effect of indicator 20 on the shape of bag 10. As shown in FIG. 5, a lower surface of rail 54 is adhered to the surface of bag 10 in a similar manner as was rail 24 in FIG. 2. An upper surface of rail 54 may have a web 56 extending at an angle therefrom. A plurality of slots 58 extending through web 56 may each receive a T-shaped tab 61 connected to first edge 62, 67. The stem of tab 61 is sized to fit loosely through slot 58; while the broader head 69 will flex to permit tab 61 to be inserted in slot 58 and then will retain it in place. Preferably, the angle between rail 54 and web 56 is such that a plane perpendicular to rail 56 is approximately parallel (±40°) to lower end 67 of side 65.

Figure 6:
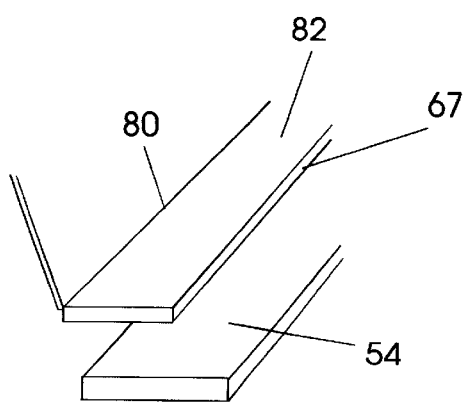
FIG. 6 shows a second embodiment of the detail of the embodiment of FIG. 3.

An alternative construction is shown in FIG. 6 to have a hinge 80 extending along and parallel to first edge 67. Hinge 80 may be formed by reducing the thickness of side 67 by partially cutting through it or by crimping it. The portion 82 between the hinge and edge 67 will pivot. The underside of portion 82 may be adhered to rail 54 or directly to bag 10 at the predetermined location for rail 54.

Figure 7:
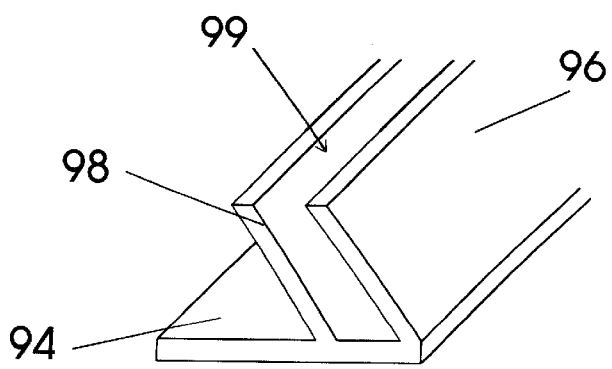
FIG. 7 shows two more embodiments of the detail of the embodiment of FIG. 3.

Experiments may show that the pivoting connection between side and rails is not necessary. In that case, the sides may be attached to the rails as shown in FIG. 7, where rail 94 has a lower side adhered to bag 10, in a similar manner as rail 54 in FIG. 5. A web 96 extends at an angle from the upper side of rail 94 such that the plane of web 96 is approximately parallel (±40°) to lower end 67. Preferably, the angle between each side and its rail is selected to make the rail planar with the surface of a properly inflated bag. If web 96 includes a parallel member 98 spaced from web 96 by a gap 99 that is about the same width of side 67, then side 65 may be friction fastened to rail 94 by sliding lower end 67 into gap 99. Member 98 may extend the entire length of web 76 or have several short spaced sections along web 76. Alternatively, lower end 67 could be adhered directly to the side of web 96.

The particular sizes and equipment discussed above are cited merely to illustrate a particular embodiment of this invention. It is contemplated that the use of the invention may involve components having different sizes and shapes as long as the principle of measuring the distance between two elongated portions of a low pressure bag, without otherwise touching the bag, is followed. For example, there are many ways that the sides may be connected to the bag and many ways that the distance between the sides may be measured. It is intended that the scope of the invention be defined by the claims appended hereto.

What is claimed is:

1. An apparatus for measuring the tension in a predetermined direction between two portions of a flexible surface, said apparatus comprising:

first and second sides each having a first end and an opposed second end, said second ends being connected together;

first means for attaching the first end of said first side to a first location on the surface;

second means for attaching the first end of said second side to a second location on the surface, wherein said second ends are spaced from said surface;

means for biasing said first means toward said second means; and indicator means for measuring the relative position of said first side with respect to said second side, said position indicating the tensile strength in said surface.

2. The apparatus of claim 1 wherein said first and second ends of each side are linear and parallel to one another.

3. The apparatus of claim 2 wherein first ends pivot with respect to said means for attaching.

4. The apparatus of claim 3 a rod forms the second end of both sides, each side further comprising a parallel, spaced pair of rigid legs, each leg having a first end pivotally connected to said means for attaching and a second end pivotally connected to said rod.

5. The apparatus of claim 4 wherein said biasing means comprises a spring.

6. The apparatus of claim 5 wherein said spring is closer to said second end than said first end.

7. The apparatus of claim 5 wherein said indicator means comprises a scale rigidly attached to one side and a pointer rigidly attached to the other side, said pointer moving over said scale as said first ends move with respect to each other.

8. The apparatus of claim 1 wherein each side comprises a plastic sheet of material, and further comprising end means for rigidly fastening the second ends to prevent movement with respect to each other, the free first ends being adjacent to each other prior to connection to said first and second means and the first ends being spread by attachment to said first and second means, whereby said means for biasing is the springy sheet material.

9. The apparatus of claim 8 wherein said second ends are adjacent each other, said apparatus further comprising clamping means for fastening said second ends together.

10. The apparatus of claim 9 wherein said clamping means comprises a springy U-shaped channel surrounding said second ends.

11. The apparatus of claim 8 wherein each of said first and second means comprises a linear rail having a lower surface that adheres to said flexible surface and an upper surface to which the first end of a side is connected.

12. The apparatus of claim 11 wherein said upper surface of said rail includes a flange extending from said rail, and said first end connects to said flange.

13. The apparatus of claim 12, wherein said first end pivotally connects to said flange.

14. The apparatus of claim 13 wherein said flange includes a linear slot and said side includes a T-shaped key portion pivotally connected to said first end and sized to be held by said flange.

15. The apparatus of claim 14, wherein said flange extends from said rail at an acute angle such that a plane perpendicular to said flange is substantially parallel to said first end when said first end is connected to said flange.

16. The apparatus of claim 11 wherein said side has a hinge parallel to and spaced from said first end, and the portion of said side between said hinge and said first end is pivotally connected to said rail.

17. The apparatus of claim 16 wherein said hinge consists of a linear crease in said side.

18. The apparatus of claim 12 wherein said flange extends from said rail at an acute angle such that a plane parallel to said flange is substantially parallel to said first end when said first end is connected to said flange.

19. The apparatus of claim 18 wherein said first means comprises means for holding said first end against said flange.

20. The apparatus of claim 19 wherein said means for holding comprises a second flange parallel to said first flange and spaced therefrom by a distance approximately equal to the width of said first end of said side.

21. The apparatus of claim 18 wherein said means for holding comprises means for adhering said first end to said flange.

22. The apparatus of claim 8 wherein each said side has a hinge parallel to and spaced from said first end, whereby the portion of said side between said hinge and said first end is pivotally connected to said side; and each of said first and second means for attaching consists of means for adhering said portion to said surface.

23. The apparatus of claim 8 wherein said indicator means comprises a strip extending from one side to a location adjacent the other side.

24. The apparatus of claim 23 wherein said indicator means consists of a piece of material integral to and extending from one side.

* * * * *